United States Patent
Korai et al.

(10) Patent No.: US 6,602,451 B1
(45) Date of Patent: Aug. 5, 2003

(54) WOODEN MATERIAL AND MANUFACTURING METHOD THEREFOR

(75) Inventors: Hideaki Korai, Ibaraki-ken (JP); Makoto Kiguchi, Ibaraki-ken (JP); Ritsuo Iwata, Shizuoka-ken (JP); Yoshihiro Hirano, Shizuoka-ken (JP); Satoshi Suzuki, Shizuoka-ken (JP)

(73) Assignees: Forestry and Forest Product Research Institute, Kukisaki-machi (JP); Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/451,740

(22) Filed: Nov. 30, 1999

(30) Foreign Application Priority Data

Dec. 2, 1998 (JP) .............................. 10-343468

(51) Int. Cl.$^7$ .............................. B27N 3/00; B27K 5/00
(52) U.S. Cl. .............................. 264/83; 8/121; 264/115; 428/537.1; 536/69
(58) Field of Search .......................... 264/83, 109, 115, 264/122, 349; 162/65, 76; 8/121; 428/536, 537.1; 536/69

(56) References Cited

U.S. PATENT DOCUMENTS

| | | | | |
|---|---|---|---|---|
| 3,554,825 A | * | 1/1971 | Goring | |
| 4,007,312 A | * | 2/1977 | Stofko et al. | |
| 4,022,965 A | * | 5/1977 | Goheen et al. | 162/65 |
| 5,074,960 A | * | 12/1991 | Nimz et al. | 162/65 |
| 5,431,868 A | | 7/1995 | Hirano | 264/83 |
| 5,525,721 A | | 6/1996 | Ohshima et al. | 536/69 |
| 5,585,054 A | * | 12/1996 | Evans | 264/83 |

FOREIGN PATENT DOCUMENTS

| | | |
|---|---|---|
| JP | 5-269710 | 10/1993 |
| JP | 7-9411 | 1/1995 |

* cited by examiner

*Primary Examiner*—Mathieu D. Vargot

(57) ABSTRACT

A wooden material is made by bonding together with a binder resin, ozonized wood elements obtained by acetylating wood elements and then ozonizing the acetylated wood elements.

26 Claims, 7 Drawing Sheets

WOODEN MATERIAL AND MANUFACTURING METHOD THEREFOR

BACKGROUND OF THE INVENTION

1. Field of the Invention

The present invention relates to wooden material where wood elements are bonded together with a binder resin, and in particular to a wooden material with good resistance to water absorption, resistance to moisture, and dimensional stability, and with excellent strength, and to a manufacturing method therefor.

This application is based on patent application No. Hei 10-343468 filed in Japan, the content of which is incorporated herein by reference.

2. Description of the Related Art

Heretofore, manufacture of wooden material has been carried out by bonding together with a binder resin, wood elements in various forms such as board, particles, chips, fibers, or powder. However with wooden material manufactured in this manner there is a problem of dimensional deviations due to high hygroscopicity, and poor water resistance and moisture resistance.

As a method for solving this problem, a method where the wood elements are subjected to acetylation processing and then bonded into an integral unit with a binder resin has been disclosed in Japanese Patent Application, First Publication Nos. 5-269710, and 7-9411. When as disclosed in these publications, the wood elements are subjected to acetylation processing, absorbency, and hygroscopicity are reduced, and consequently dimensional stability is improved.

However, wooden materials made using wood elements, which have been subjected to acetylation processing, have the defect that the strength is lower compared to wooden material made from wood elements which have not been subjected to acetylation processing.

In particular, with fiberboard made using wood fibers as the wood elements, the drop in bending strength due to acetylation is comparatively large. For example the bending strength measured in accordance with JIS A 5908, of fiberboard made by bonding wood fibers (trade name F-4-17, manufactured by Canadian Forest Products Ltd. of Canada) using denatured melamine (15% of the wood fibers) was approximately 34 MPa for the case with no acetylation processing of the wood fibers, compared to approximately 16 MPa for the case with acetylation processing of the wood fibers.

One reason for this drop in strength is considered to be due to a drop in adhesion of the wood fibers with binder resins such as urea, melamine, phenol, urethane, due to the acetylation. Furthermore, it was also considered difficult to have a rock hard layer of high density and high rigidity for the surface layer of the fiberboard.

Accordingly, it is an object of present invention to provide a wooden material having excellent resistance to water absorption and resistance to moisture, good dimensional stability, as well as excellent strength.

SUMMARY OF THE INVENTION

In order to solve the above problems, the wooden material of the present invention comprises ozonized wood elements and binder resin bonding said ozonized wood elements together, wherein said ozonized wood elements are made by acetylating wood elements and then subjecting the acetylated wood elements to an oxidization treatment using ozone.

With the present invention, resistance to water absorption and resistance to moisture are excellent and hence dimensional stability is good. Moreover the adhesiveness between the wood element and the binder resin is improved and a rock hard base layer is formed on the front and rear surfaces, thus giving a wooden material with excellent strength.

DESCRIPTION OF THE PREFERRED EMBODIMENTS

Figure 1:
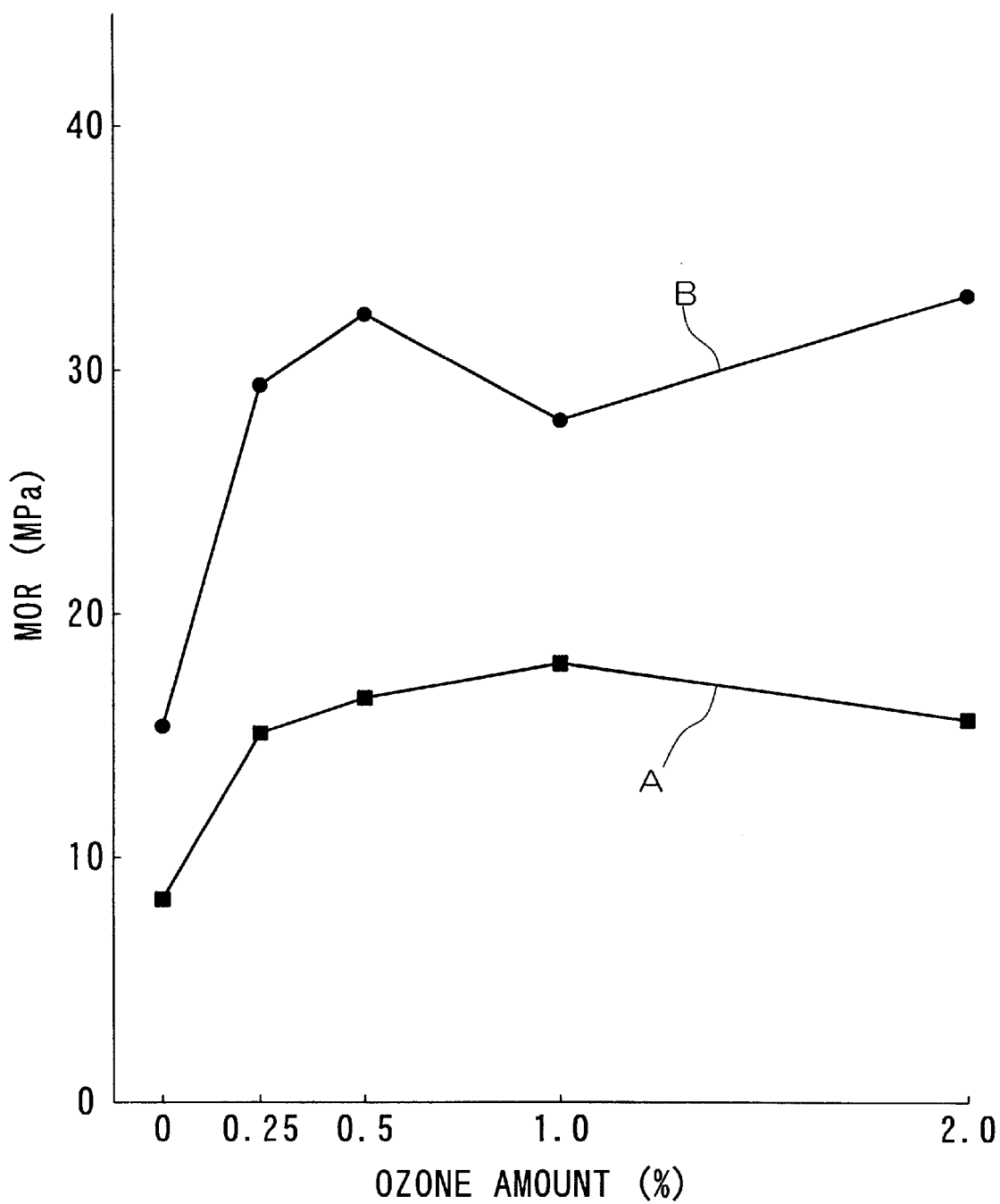
FIG. 1 is a graph showing a relation between bending strength and ozone amount in wooden material obtained as examples of the present invention and as a reference example.

As follows is a detailed description of the present invention.

With the present invention, for the wood elements, wooden material of various forms, which can form a wooden material using a binder resin can be used. For example wood particles or chips (particles), powder, fiber, strands, flakes, wafers, veneer, articles and the like can be used.

Here wooden material with wood fibers bonded with a binder resin to give a density of greater than 0.80 g/cm$^3$, is referred to as hard board. Moreover, for wooden material made by bonding fibers with a binder resin, there is fiberboard, medium density fiberboard (MDF), and the like.

Furthermore, wafers are chips of wood approximately 0.6 mm thick by 50 mm wide by 50~70 mm long. Wafer board is a wooden material made by bonding these with a binder resin.

Flakes are chips of wood approximately 0.6 mm thick by 10 mm wide by 10~30 mm long. Flake board is a wooden material made by bonding these with a binder resin.

Strands are chips of wood approximately 0.6 mm thick by 20 mm wide by 50~300 mm long. Oriented strand board (OSB) is a wooden material made by bonding these with a binder resin.

Particles is the generic term for chips or particles smaller than flakes. Particleboard is a wooden material made by bonding these with a binder resin.

Furthermore, articles are a board material approximately 10~20 mm thick. Wooden material made by bonding these with a binder resin is referred to as laminated material.

Veneers are thin boards approximately 3 mm thick. Wooden material made by bonding these with a binder resin, with the fibers of the veneers constituting respective layers arranged in one direction so as to be oriented on one axis is referred to as laminated veneer lumber (LVL), while wooden material made with the fibers of the veneers constituting respective layers arranged orthogonal to each other so as to be oriented on two axes is referred to as plywood.

Hereunder embodiments of the present invention are described with wood fibers given as an example for the wood elements. However, wood particles or wood chips may be used as the wood elements. That is, the wooden material of the present embodiment is a fiberboard made by bonding with a binder resin, ozonized wood fibers made from acetylated wood fibers which have been further ozonized.

With the present embodiment, for the wood fibers, for example chips made by chopping up wood in a chopper into chips, digesting the resultant chips with high pressure steam and then fiberizing with a disk refiner or the like can be used. There is no particular limitation to the shape of the wood fibers. For example these are 0.1~1.0 mm thick, and 0.2~50 mm long.

Preferably the wood fibers are dried to give a water content of less than 3% and preferably less than 1% before a later described acetylation. This is because if the wood fibers contain water, the acetic anhydride of the acetylating agent vapor pre-reacts with the water so that the efficiency of acetylation is reduced.

The acetylation process in the present invention, is preferably carried out for example by bringing into contact wood fibers and gaseous vapor of the acetylating agent in the vapor phase. Due to this acetylation, a part of the hydroxyl group (OH) in the wood fiber (W) is replaced by the acetyl group (OCOCH$_3$) according to the following equation.

$$[W]\text{-OH} + (CH_3CO)_2O \rightarrow [W]\text{-OCOCH}_3 + CH_3COOH + (54 \text{ kcal})$$

For the acetylating agent used at this time, acetic anhydride is most suitable. Moreover, the degree of acetylation in this acetylation process is, at a weight percent gain, normally 10~30% and preferably 12~22%. This may however be suitably altered to meet the required absorbency resistance and moisture resistance.

The ozonization process (the oxidization treatment using ozone) in the present invention can be performed using an ozone processing unit comprising an ozone generator for generating ozone from raw material gas and a reaction vessel for bringing into contact the generated ozone and the wood fibers, and contacting the ozone with the wood fibers inside the reaction vessel for a predetermined time. For the raw material gas, for example oxygen may suitably be used. Normally oxygen gas containing approximately 3~4% ozone is supplied to the reaction vessel.

The amount of ozone reacted with the wood fibers is preferably within a range of 0.10~2.00% of the amount of wood fibers introduced to the reaction vessel. If the ozone amount is less than this, the effect of an increase in bending strength of the wooden material due to the ozonization cannot be obtained. Moreover, if the ozone amount is greater than 2.00%, a noticeable increase in the effect cannot be obtained, or rather the processing speed of the ozonization is slow, this becomes uneconomical and is thus undesirable.

With the ozonization, for the main reaction, an oxidizing cleavage reaction of the aromatic nucleus of the lignin in the wood fibers occurs, and for the initial product of the reaction a muconate derivative is produced. This muconate derivative is presumed to contribute to the adhesion at the time of hot pressing due to its abundant reactivness.

For the binder resin in the present invention, for example adhesives such as a melamine resin system, a phenol resin system, a urea-formaldehyde resin system, an epoxy resin system, or a polyurethane resin system, foaming resins, MDI(4,4'-diphenylmethane diisocyanate), or mixtures of these are used. In particular denatured melamine resin is ideally used being advantageous from the point of countermeasures against formalin, and improving durability.

There is no particular limit on the amount of the above binder resin used, and for example this is 5~25 wt % in the solid with respect to the wood fibers. If the binder resin is less than 5 wt %, the bonding of the wood fibers is insufficient, while if this exceeds 25 wt %, the binder resin is excess and is thus uneconomical.

Moreover, as required, a hardener, a curing catalyst, a hardening accelerator, a diluent, a thickener, an adhesive, a dispersant, a water repellent and the like may be added to the binder resin.

Next is a description of the method of manufacturing the wooden material of the embodiment.

At first, the wood fibers are subjected to an acetylation process, after which the acetylating agent is removed. The acetylation process may be carried out in the vapor phase, or in the liquid phase.

As a concrete method for when acetylation is carried out in the vapor phase, there is for example the method where acetylating agent is filled into the bottom of a reactor vessel, and a net made for example from stainless steel wire, is stretched thereabove, with the wood fibers placed on the net, and the acetylating agent is then heated to generate vapor of the acetylating agent, so that the wood fibers and the vapor of the acetylating agent are brought into contact with each other. The reaction time is from around 15 mins~3 hrs, and may be appropriately varied depending on the required degree of acetylation. Moreover, the reaction temperature is around 140~200° C. (preferably 140~160° C.) and the reaction pressure is at atmospheric pressure.

Furthermore, at the time of acetylation of the wood fibers, the acetylating agent such as acetic anhydride may be used diluted with a deactivated solvent such as xylene which does not react with the acetylating agent. The amount of solvent used in this case is made less than 70 wt % of the total weight of the acetylating agent and the solvent. By using this mixture of acetylating agent and solvent, the acetylation reaction which is an exothermic reaction can be made to proceed under moderate conditions, the reaction process is facilitated, and excessive acetylation or thermal degradation of the wood fibers can be suppressed.

After this, the acetylated wood fibers are subjected to ozonization processing to give the ozonized wood fibers.

For example, oxygen is supplied as the raw material gas to an ozone generator (SA100PV: manufactured by Yamanashi High-Tec (Ltd.)), and the generated ozone is entrained with the oxygen gas and piped to a reaction vessel at a constant flow rate. Acetylated wood fibers are dumped into the reaction vessel, and these wood fibers and the oxygen gas containing ozone are contacted with each other. At this time, so that an amount of ozone of a predetermined proportion with respect to the weight of wood fibers comes into contact with the wood fibers, the flow rate and the processing time of the oxygen gas containing ozone is determined corresponding to the weight of the wood fibers and the ozone concentration in the oxygen gas containing ozone. Furthermore, during the process, the reaction vessel is preferably stirred so that the wood fibers and the ozone are uniformly reacted.

Next a binder resin is applied to the obtained ozonized wood fibers. As a method of applying the binder resin to the ozonized wood fibers there is for example a method involving application by a spray technique. More concretely, this uses a method where the wood fibers are placed inside a blender which is rotated at a slow speed, and the binder resin is spray applied inside the blender as the wood fibers drops naturally in the blender.

After this, the wood fibers which have been coated with the binder resin are made into a mat form by a well known forming technique, and then subjected to heating and pressure to form boards which are then built up to thereby give a fiberboard.

The temperature at the time of forming the fiberboard is set depending on the binder resin used. There is no particular limit, however for example in the case where denatured melamine is used 150~190° C. is preferable.

Moreover, there is no particular limit to the pressure at the time of forming the fiberboard. For example this is around 10~40 kgf/cm². Furthermore, the formation time for a formation thickness of for example 10 mm is around 2~7 mins.

Furthermore, at the time of forming the wood fibers, flame retardant, colorant, insecticide, preservative, fungicide, water repellent, sound absorbing material, foam beads, filler, reinforcing material and the like, may be added as required.

With the fiberboard manufactured in this manner, the wood fibers which have been subjected to the acetylation process and then to the ozonization process are bonded with the binder resin. Therefore, this has excellent water absorption resistance and moisture resistance, and dimensional stability is good. Moreover, by subjecting the wood fibers to ozonization processing after acetylation processing, the adhesiveness of the binder resin with the wood fibers is improved. Furthermore at the time of forming, and heating and press forming, a rock hard base layer of high density and hardness is formed in the surface layer portion, giving a fiberboard of excellent strength. In particular, in the case where the binder is a foam polyurethane resin, then due to the activated oxygen, the water component and the binder are easily combined, giving a fiberboard with high density and excellent strength.

In particular, by making the reacting ozone amount 0.1~2.0% with respect to the acetylated wood element, a wooden material with excellent bending strength can be obtained with good efficiency.

With the present embodiment, the description has been given for the example of the case where the fiberboard is made using wood fibers as the wood elements. However, the present invention can also be similarly applied to the case where various wooden materials are made using the above-mentioned wood elements of particles and chips (particles), powder, strands, flakes, wafers, veneers, articles and the like. Similarly, as well as the excellent resistance to water absorption and resistance to moisture, with good dimensional stability, the adhesiveness of the binder resin with the wood fibers is improved, and a rock hard layer of high density and hardness is formed in the surface layer portion, giving a fiberboard of excellent strength.

EXAMPLES

As follows is a description of examples to give a better understanding of the present invention. The examples illustrate one mode of the present invention. The invention however is not limited to this, and the scope of the present invention may be optionally modified.

Example A-1

A fiberboard was manufactured using wood fibers as the wood elements. That is, wood fibers approximately 0.1~1.0 mm thick and 2~35 mm long (trade name F-4-17; manufactured by Canadian Forest Products Ltd. of Canada) were prepared and dried to give a water content of 3%.

These was then acetylated with acetic anhydride using a gaseous phase acetylation processor (Sumitomo Chemical Engineering Co. Ltd.), and the unreacted acetic anhydride removed by suction. The degree of acetylation of the wood fibers was 17% for the weight percent gain (WPG).

After this, the acetylated wood fibers were introduced to a reaction vessel of an ozone processing apparatus and subjected to ozonization processing. For the raw material gas, oxygen gas was used. The processing conditions were 3~4 wt % ozone concentration for the oxygen gas contacting with the wood fibers 1 liter/min flow rate for the oxygen gas containing ozone supplied to the reaction vessel, and 11.05 minutes processing time, giving 0.25% ozone amount reacted with the wood fibers.

Next, 197 g of ozonized wood fibers were introduced to a blender rotating at a low speed, and a binder resin was sprayed into the blender while the ozonized wood fibers fell naturally in the blender. For the binder resin, a resin composition with total body water of approximately 20% with 4.3 g of 10% $NH_4Cl$ added to 45.5 g of denatured melamine (trade name Yu-Roido U816, manufactured by Mitsui Chemicals Ltd) was used.

After this, the ozonized wood fibers which had been coated with the binder resin were formed to a thickness of approximately 200 mm and then subjected to thermo-compression forming at a temperature of 180° C., and a pressure of 40~10 kgf/cm² for 5 minutes, to give a fiberboard (A-1), 180 mm wide, 220 mm long, and 10 mm thick. The density of this fiberboard was 0.5 g/cm³.

The density of the fiberboard was measured by performing tests in accordance with JIS A 5908 (similarly hereunder).

Examples A-2~4

Of the ozonization processing conditions in the example A-1, the ozone amount inside the reaction vessel was changed so that the ozone amount reacting with the wood fibers was respectively 0.5%, 1.0% and 2.0% with other conditions the same, to thus produce fiberboards (A-2~4) of a density of 0.5 g/cm³.

Example B-1

In the binder application step in the above mentioned example A-1, for the binder resin, a resin composition with a total body water of approximately 20% with 6.4 g of 10% $NH_4Cl$ added to 67.4 g of denatured melamine (trade name Duroid U816, manufactured by Mitsui Chemicals Ltd) was used for 292.2 g of ozonized wood fibers, with other conditions the same, to thus produce a fiberboard (B-1) of a density of 0.74 g/cm³.

Examples B-2~4

Of the ozonization processing conditions in the example B-1, the ozone amount inside the reaction vessel was changed so that the ozone amount reacting with the wood fibers was respectively 0.5%, 1.0% and 2.0% with other conditions the same, to thus produce fiberboards (B-2~4) of a density of 0.74 g/cm³.

Reference Example 1

In the examples A-1 and B-1, the ozone amount reacting with the wood fibers at the time of performing ozonization processing was made 0% with other conditions the same, to thus respectively produce fiberboards of 0.5 g/cm³ density (A-0) and 0.74 g/cm³ density (B-0).

Reference Example 2

In the examples A-1~4 and the examples B-1~4, and the reference example 1, the ozonization processing was performed on the wood fibers without performing the acetylation processing, with other conditions the same, to thus obtain respective fiberboards. Fiberboards of density 0.5 g/cm³ respectively obtained in the same manner as for A-0~4 are denoted C-0~4. Moreover, fiberboards of density 0.74 g/cm³ respectively obtained in the same manner as for B-0~4 are denoted D-0~4.

Test Example 1

For the fiberboards obtained by examples A-1~4, examples B-1~4 and reference example 1, the bending strength (referred to hereunder as MOR) was measured. The MOR measurement was performed in accordance with JIS A 5908. The results are shown in FIG. 1. In FIG. 1, the horizontal axis represents the ozone amount (%) reacted with the wood fibers, while the vertical axis represents the MOR (Units: MPa). Moreover in FIG. 1, ■ shows the results for examples A-1~4 and A-0 of reference example 1, while ● shows the results for examples B-1~4 and B-0 of reference example 1.

Test Example 2

For the fiberboards obtained by examples A-1~4, examples B-1~4, reference example 1, and reference example 2, the water absorption thickness swelling coefficient (referred to hereunder as TS) was measured.

Figure 2:
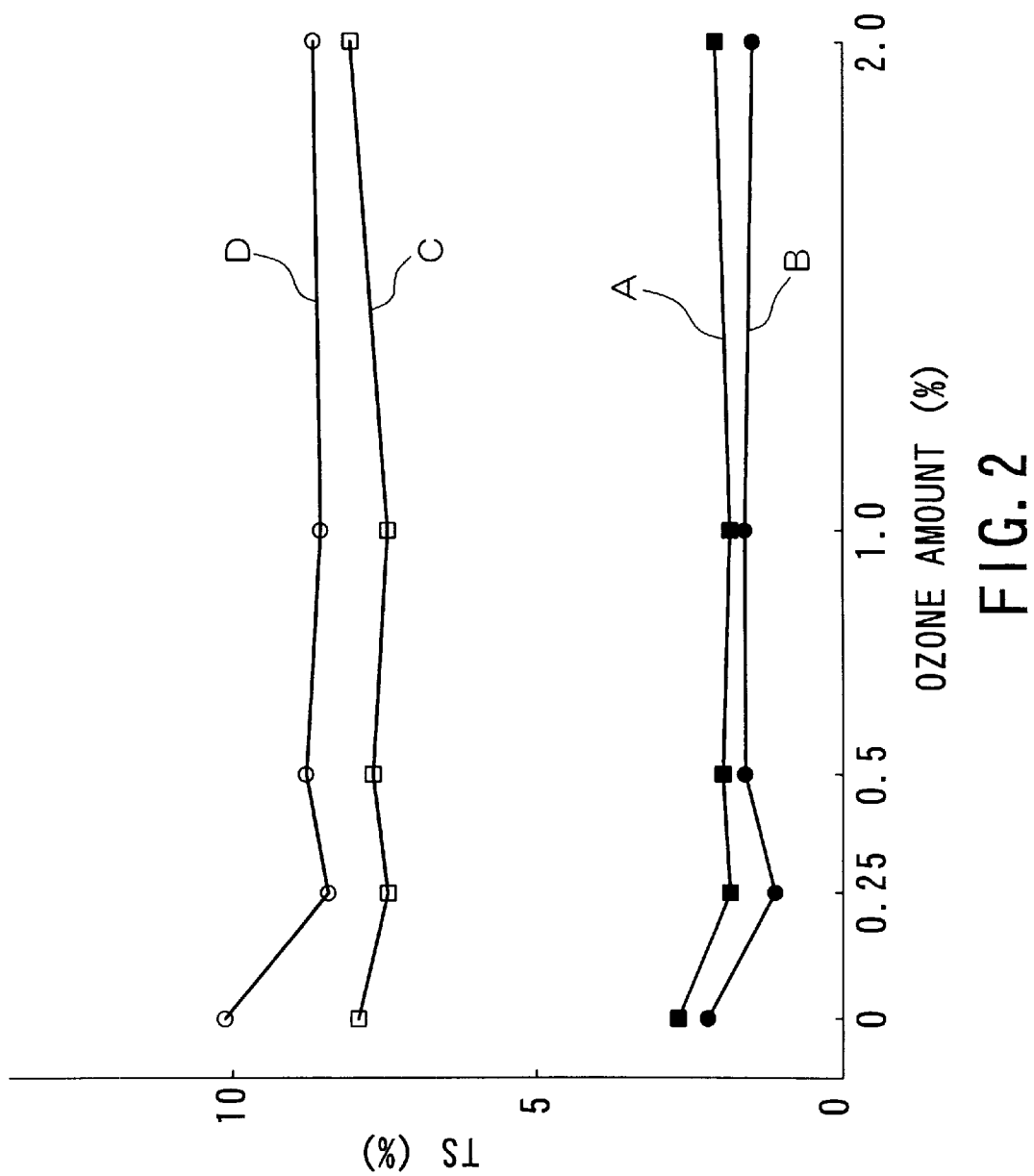
FIG. 2 is a graph showing a relation between water absorption thickness swelling coefficient and ozone amount in wooden material obtained as examples of the present invention and as reference examples.

For the TS, the test piece was placed in an environmental test unit, and the thickness change proportion after leaving standing for 24 hrs in water at the temperature of 20° C. was measured. The results are shown in FIG. 2. In FIG. 2, the horizontal axis represents the ozone amount (%) reacted with the wood fibers, while the vertical axis represents the TS (Units: %). Moreover in FIG. 2, ■ shows the results for examples A-1~4 and A-0 of reference example 1, ● shows the results for examples B-1~4 and B-0 of reference example 1, □ shows the results for C-0~4 of reference example 2, while ○ shows the results for D-0~4 of reference example 2.

Test Example 3

With the fiberboard obtained for the examples B-1~4 and B-0 of reference example 1, the density profile in the thickness direction was measured. This measurement was made using a density profilometer (manufactured by ART Ltd of Germany).

FIGS. 3~7 show the results, showing the density profile in the thickness direction for the fiberboard of the respective examples B-0, B-1, B-2, B-3, and B-4. In FIGS. 3~7, the horizontal axis represents the surface of the fiberboard as zero with the thickness (units: mm) extending from the front surface towards the rear surface, while the vertical axis represents the density (units: g/cm³).

From the results of FIG. 1, for the fiberboards A-0~4 of density 0.5 g/cm³, with the ozone amount reacted with the wood fibers above 0.1%, an MOR of greater than 11 MPa was attained, while when the ozone amount was 1.0%, the MOR became a maximum value at 18.0 MPa. Furthermore, in particular in the range up to an ozone amount of 0.25%, the MOR increased rapidly.

Moreover, for the fiberboards B-0~4 of density 0.74 g/cm³, with the ozone amount reacted with the wood fibers above 0.1%, an MOR of greater than 21 MPa was attained, while when the ozone amount was 2.0%, the MOR became a maximum value at 33.0 MPa. Furthermore, in particular in the range up to an ozone amount of 0.25%, the MOR increased rapidly.

This shows that by ozonization of the acetylated wood fibers in this way an effect of increasing the MOR of the fiberboard is obtained.

With the results of FIG. 2, compared to the C-0~4 and the D-0~4 where acetylation of the wood fibers was not carried out, with the A-0~4 and the B-0~4 which had been subjected to acetylation the TS was significantly lowered. Moreover, also in A and B compared to the A-0 and B-0 where the ozone amount was zero, the A-1~4 and B-1~4 where the ozone had been reacted had an even lower TS. From this, it could be discerned that dimensional stability was greatly increased due to carrying out acetylation, and that dimensional stability was also increased with ozonization.

Figure 3:
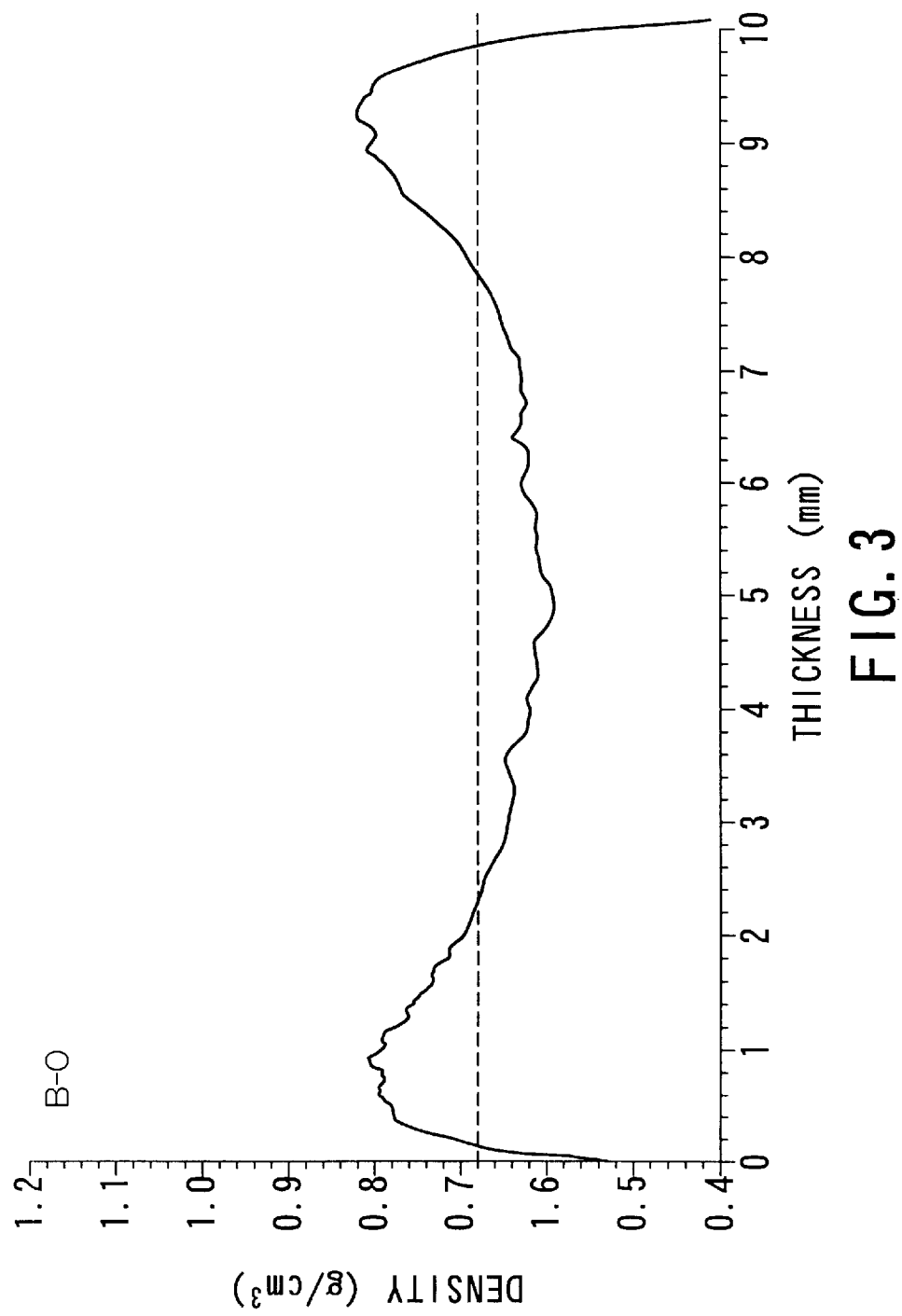
FIG. 3 is a density profile in the thickness direction of a wooden material obtained as a reference example of the present invention.
Figure 4:
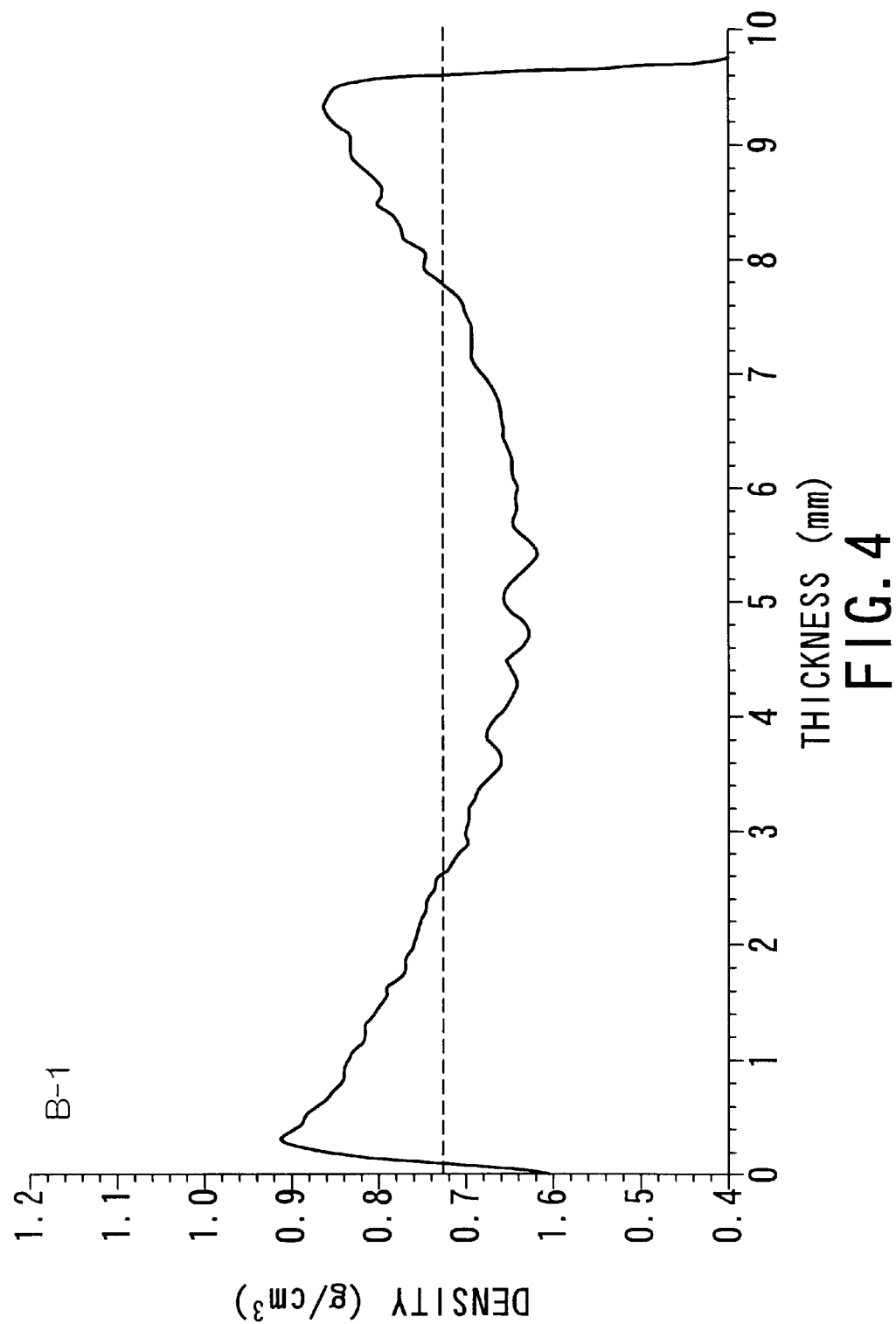
FIG. 4 is a density profile in the thickness direction of a wooden material obtained as an example of the present invention.
Figure 5:
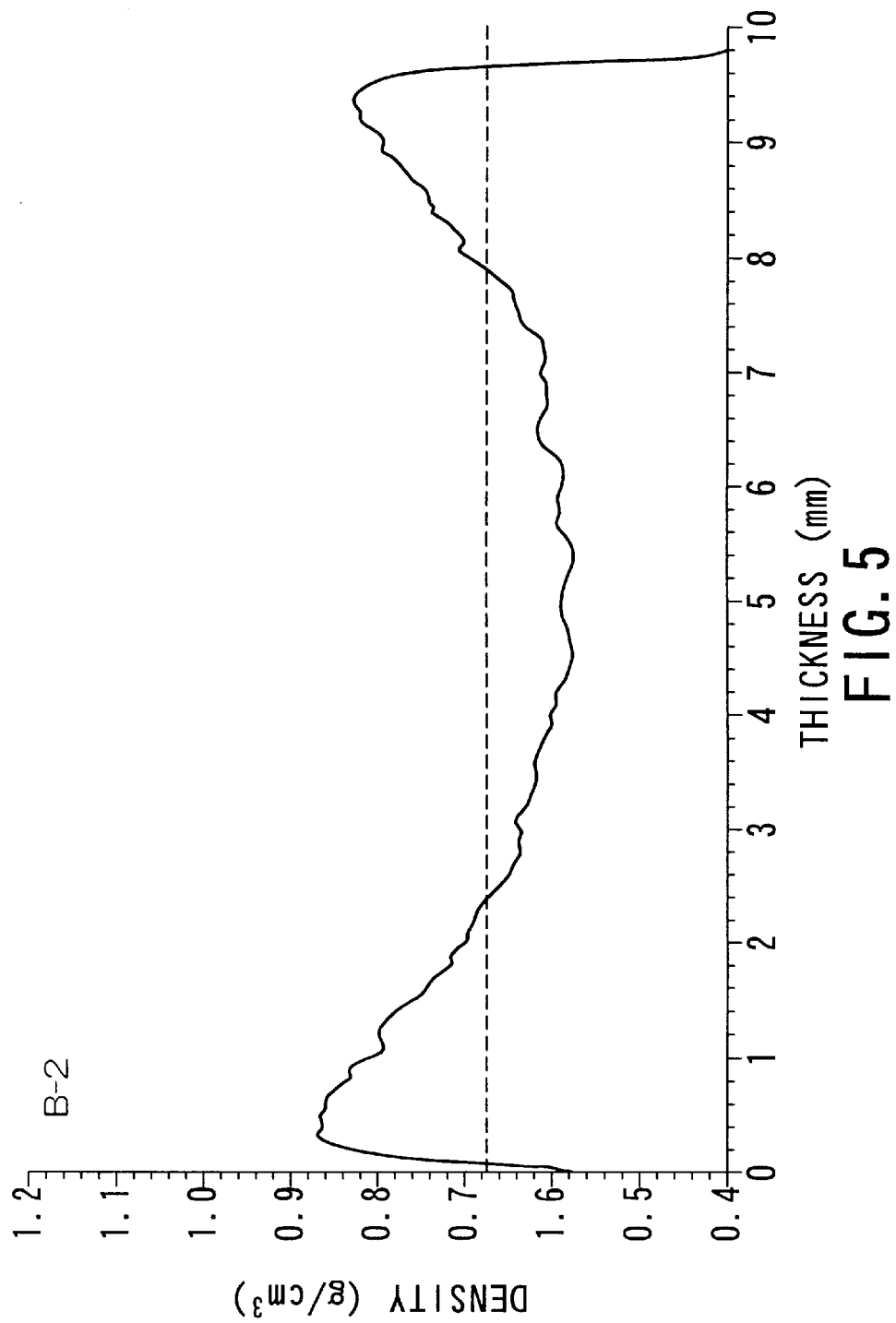
FIG. 5 is a density profile in the thickness direction of a wooden material obtained as an example of the present invention.
Figure 6:
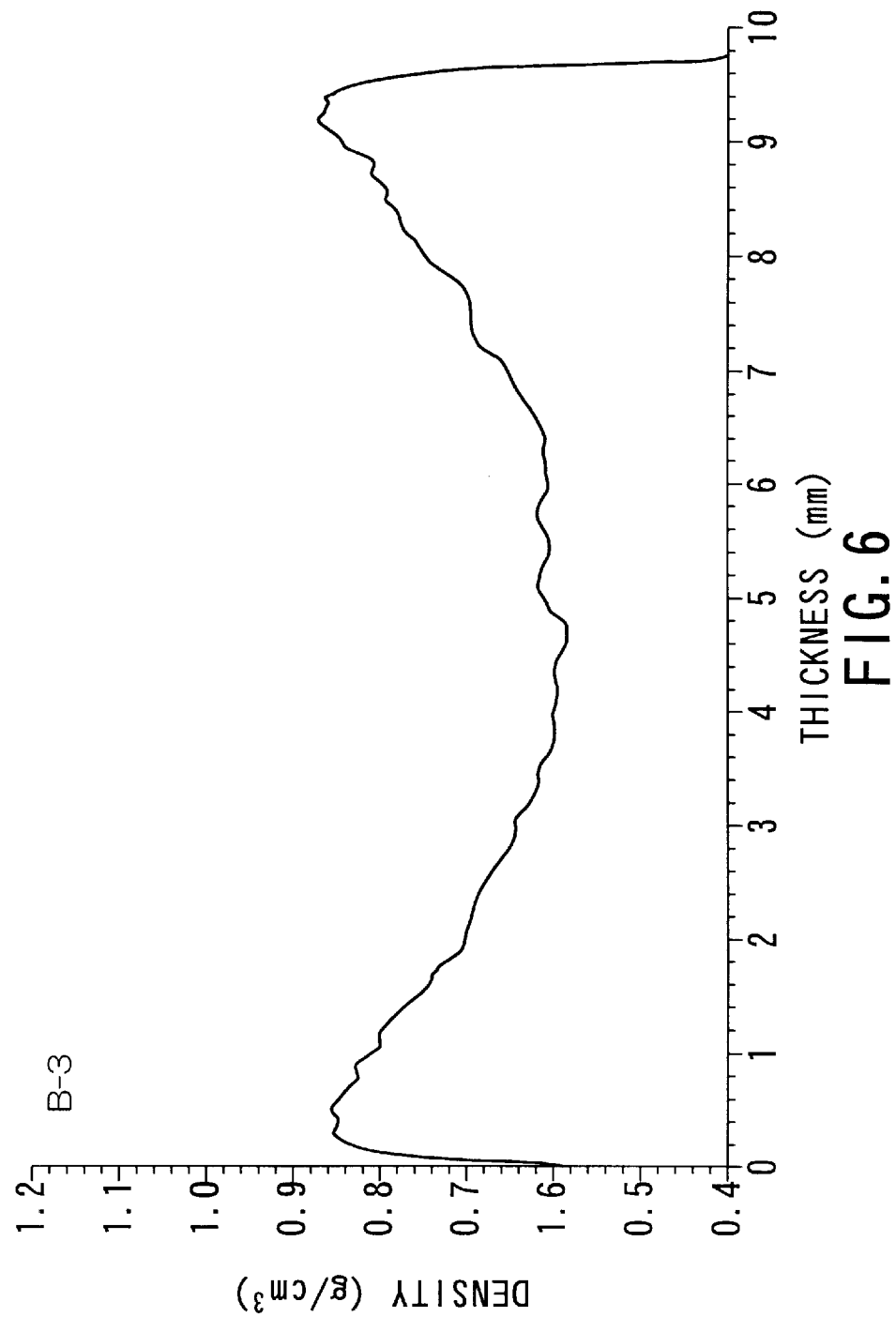
FIG. 6 is a density profile in the thickness direction of a wooden material obtained as an example of the present invention.
Figure 7:
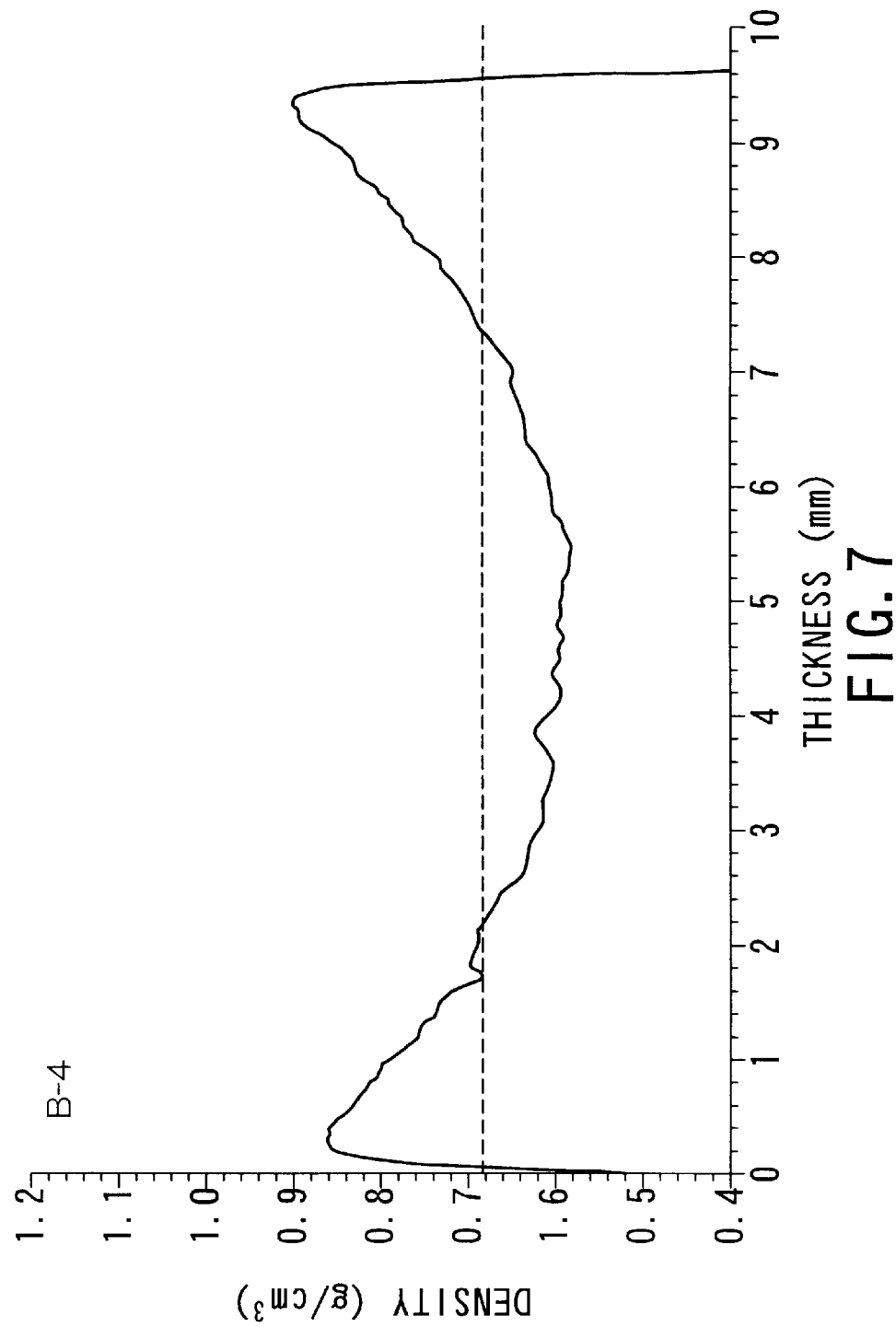
FIG. 7 is a density profile in the thickness direction of a wooden material obtained as an example of the present invention.

Concerning the results of FIGS. 3~7, compared to the product of FIG. 3 with the ozone amount at zero, with the products of FIGS. 4~7 where ozonization had been carried out a high density layer exists in the front surface portion and the rear surface portion, thus showing the formation of a rock hard layer. Consequently, with the fiberboard of FIGS. 4~7, it was seen that the front surface and rear surface were hard with excellent strength.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, will be apparent to, and may be made by, persons of ordinary skill in the art having reference to this description. It is contemplated that all such changes and additional embodiments are within the spirit and true scope of the invention as claimed.

What is claimed is:

1. A wooden material, comprising ozonized wood elements and binder resin bonding said ozonized wood elements together, wherein said ozonized wood elements are made by subjecting wood elements to an acetylation process and then to an oxidization treatment using ozone.

2. A wooden material according to claim 1, wherein an amount of ozone reacted with said wood elements in said oxidization treatment using ozone is within a range of 0.10~2.00% of an amount of said wood elements.

3. A wooden material according to claim 1, wherein said wood element is a member selected from the group consisting of wood fiber, wood particle, wood chip and mixtures thereof.

4. A method for manufacturing an ozonized wood element, comprising the steps of:

subjecting a wood element to an acetylation process to obtain an acetylated wood element; and subjecting said acetylated wood element to an oxidization treatment using ozone.

5. A method for manufacturing an ozonized wood element according to claim 4, wherein said wood element is wood fiber wood particle and wood chip, and having a further step of subjecting wood to a fiberizing treatment to obtain a wood fiber.

6. A method for manufacturing an ozonized wood element according to claim 4, wherein said acetylation process is carried out by bringing said wood element into contact with an acetylating agent.

7. A method for manufacturing an ozonized wood element according to claim 6, wherein a reaction temperature of said acetylation process is 140~200° C.

8. A method for manufacturing an ozonized wood element according to claim 7, wherein a reaction temperature of said acetylation process is 140~160° C.

9. A method for manufacturing an ozonized wood element according to claim 6, wherein a reaction pressure of said acetylation process is an atmospheric pressure.

10. A method for manufacturing an ozonized wood element according to claim 6, wherein said acetylating agent is an acetic anhydride.

11. A method for manufacturing an ozonized wood element according to claim 4, wherein said oxidization treatment using ozone is performed by generating ozone from raw material gas and then contacting said ozone with said acetylated wood element.

12. A method for manufacturing an ozonized wood element according to claim 11, wherein said raw material gas is oxygen.

13. A method for manufacturing an ozonized wood element according to claim 11, wherein an amount of ozone reacted with said acetylated wood element in said oxidization treatment using ozone is within a range of 0.10~2.00% of an amount of said acetylated wood element.

14. A method for manufacturing a wooden material, comprising the steps of:

subjecting wood elements to an acetylation process to obtain acetylated wood elements;

subjecting said acetylated wood elements to an oxidization treatment using ozone to obtain ozonized wood elements; and applying a binder resin to said ozonized wood elements and then accumulating, heating and press forming to obtain a wooden material.

15. A method for manufacturing a wooden material according to claim 14, wherein said wood elements are wood fibers, and having a further step of subjecting wood to a fiberizing treatment to obtain wood fibers.

16. A method for manufacturing a wooden material according to claim 14, wherein said acetylation process is carried out by bringing said wood elements into contact with acetylating agent.

17. A method for manufacturing a wooden material according to claim 16, wherein a reaction temperature of said acetylation process is 140~200° C.

18. A method for manufacturing a wooden material according to claim 17, wherein a reaction temperature of said acetylation process is 140~160° C.

19. A method for manufacturing a wooden material according to claim 16, wherein a reaction pressure of said acetylation process is atmospheric pressure.

20. A method for manufacturing a wooden material according to claim 16, wherein said acetylating agent is an acetic anhydride.

21. A method for manufacturing a wooden material according to claim 14, wherein said oxidization treatment using ozone is performed by generating ozone from raw material gas and then bringing said ozone into contact with said acetylated wood elements.

22. A method for manufacturing a wooden material according to claim 21, wherein said raw material gas is oxygen.

23. A method for manufacturing a wooden material according to claim 21, wherein an amount of ozone reacted with said acetylated wood elements in said oxidization treatment using ozone is within a range of 0.10~2.00% of an amount of said acetylated wood elements.

24. A method for manufacturing a wooden material according to claim 14, wherein said binder resin is a member selected from the group consisting of a melamine resin system adhesive, a phenol resin system adhesive, a urea-formaldehyde resin system adhesive, an epoxy resin system adhesive, a polyurethane resin system adhesive, foaming resins, MDI, and mixtures thereof.

25. A method for manufacturing a wooden material according to claim 14, wherein an amount of said binder resin is 5~25 wt % in the solid with respect to said ozonized wood elements.

26. A method for manufacturing a wooden material according to claim 14, wherein at least one addition agent selected from the group consisting of a hardener, a curing catalyst, a hardening accelerator, a diluent, a thickener, an adhesive, a dispersant, and a water repellent is added to said binder resin.

* * * * *